June 5, 1956    J. W. MacCLATCHIE    2,748,718

PUMP AND PISTON COMBINATION

Filed Feb. 6, 1952

INVENTOR,
JOHN W. MacCLATCHIE
BY
Robert M. McManigal
Attorney

United States Patent Office 2,748,718
Patented June 5, 1956

2,748,718

PUMP AND PISTON COMBINATION

John W. MacClatchie, Saugus, Calif.

Application February 6, 1952, Serial No. 270,251

5 Claims. (Cl. 103—202)

My invention relates to a combination of a mud pump and a piston. More particularly my invention relates to a combination of a mud pump and a piston in which the piston is provided with a passageway connecting the center peripheral portion of the piston with the outside of the pump in which it is operated for the purpose of indicating the condition of the piston or for the purpose of supplying a lubricant to the piston.

In conventional mud pumps and pistons, it is often difficult, if not impossible, to ascertain when the packing elements of the piston fail, with the result that when the piston fails, the liner or piston body, and frequently both the liner and piston body, are damaged.

An object of my invention is to provide a means of indicating the condition of the piston.

Another object of my invention is to provide a means of ascertaining when the piston fails.

Another object of my invention is to provide a piston having passageways connecting the center peripheral portion of the piston with the outside of the pump in which the piston is operated in order to permit escape of fluid for the purpose of indicating the damaged condition of the piston.

Another object of my invention is to provide a piston with means for lubricating the piston and the liner.

My invention has many other objects, advantages, and features, some of which, with the foregoing, will be set forth at length in the following description where I shall outline one form of my invention, which I have selected for illustration in the drawings accompanying and forming a part of the present specification.

Figure 1:
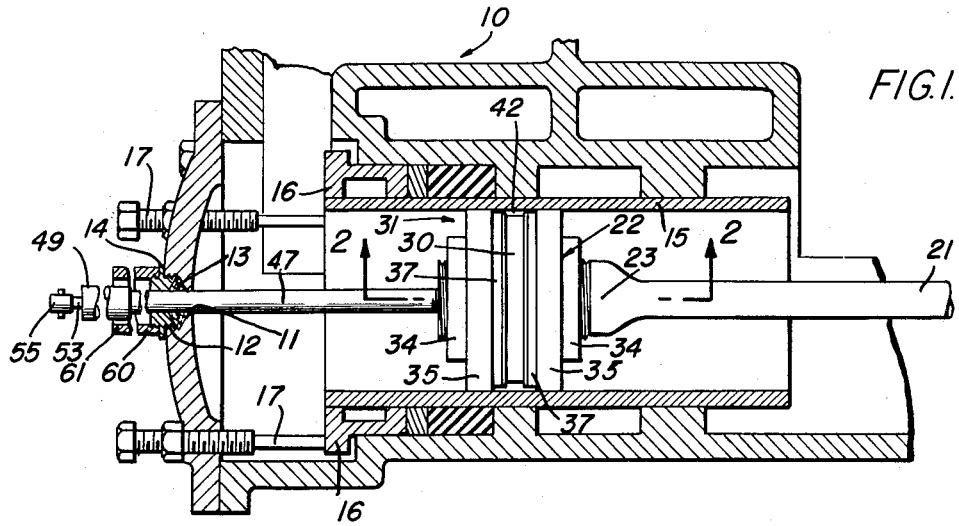
Fig. 1 is a view, partly broken away, of a pump having a piston embodying the invention.
Figure 2:
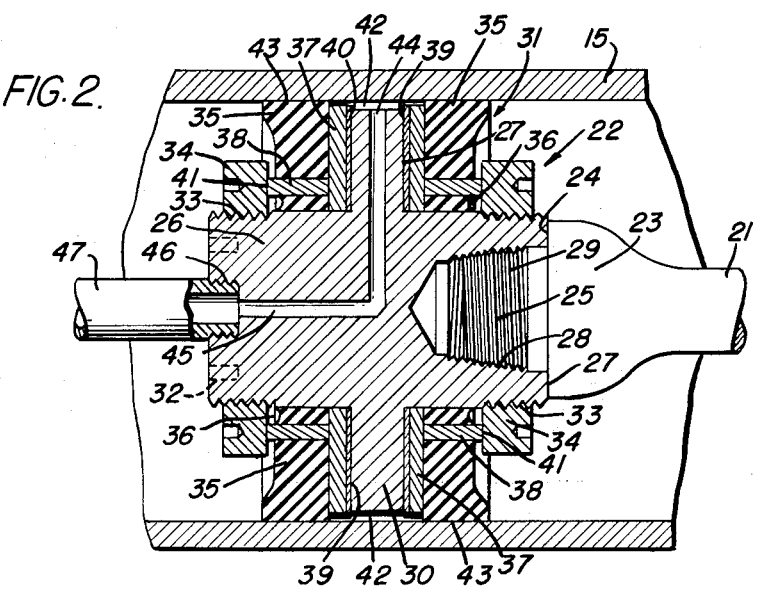
Fig. 2 is a section taken along the line 2—2 of Fig. 1.
Figure 3:
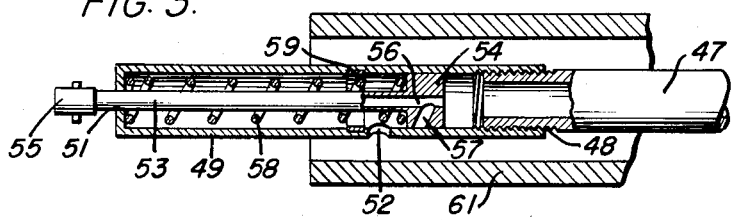
Fig. 3 is an enlarged fragmentary view showing the parts broken away in Fig. 1.

Referring to the drawings, the numeral 10 designates a conventional slush pump, other than that the pump is provided with a counterbored hole 11, the counterbored portion 12 of which is threaded, packing 13 and a packing nut 14. A liner 15 is secured in place by means of a gland 16 and studs 17.

The invention may be embodied in substantially any conventional piston used in slush pumps. For the purpose of illustration, I have embodied the invention in a combination piston rod 21 and piston 22.

The piston rod 21 is provided with an enlarged end 23 terminating in an annular shoulder 24 and tapered male threads 25. The piston body 26 is provided with an annular shoulder 27, a tapered recessed portion 28, which is provided with tapered female threads 29, an annular radially projecting abutment or flange 30, which forms a backing for packing elements 31, and holes 32 for suitable wrenches in order to assemble and disassemble the combination rod and piston.

The piston is provided with suitable packing elements 31 on each side of the radial flange 30. The construction of the particular packing elements used, forms no part of the present invention. However, I prefer to use a construction in which the packing elements 31 are adapted to be sealed off with respect to the radial flange 30 without distorting the resilient portions of the packing elements.

The ends of the piston body 26 are threaded as indicated at 33, and provided with retaining nuts 34 having holes for suitable wrenches. The packing elements 31 are formed in part of rubber or other suitable resilient material 35. The outer ends of the packing elements 31 may be provided with annular grooves 36, the sides of which grooves adjacent to the piston body 26 are adapted to be expanded by fluid pressure to seal off the packing elements 31 with respect to said piston body 26. Means are provided to seal off the packing elements 31 with respect to the radial flange 30 without distorting the resilient portions 35 of the packing elements. As an instance of this arrangement, the inner end of each packing element 31 is reinforced with a metallic plate 37, and the packing elements 31 are provided with longitudinally projecting annular members 38 which are welded or otherwise secured to the metallic plates 37. Resilient material, fabric, or other suitable material 39, is also provided on the inner ends 40 of said metallic plates 37, which material may be vulcanized or otherwise secured to the metallic plates 37 at the same time that the resilient material 35 is vulcanized to said plates and to said annular members 38. The packing elements 31 may be sealed off with respect to the flange 30 without distorting the resilient portions 35 of said packing elements, by means of the retaining nuts 34 which are adapted to engage the outer ends 41 of the annular members 38, and tighten said members with respect to the flange 30.

An annular recess 42 may be provided between the packing elements 31 and beyond the periphery of the radial flange 30, so that an annular space will be provided for fluid that leaks between the outer peripheries 43 of the packing elements 31 and the inside wall of the liner 15.

The piston body is provided with a radial passageway 44 which communicates with the annular recess 42 and with a longitudinal passageway 45. The outer end of passageway 45 is enlarged and threaded as indicated at 46. A tubular member 47 is positioned through the packing nut 14, packing 13 and hole 11 of the pump 10. The inner end of said tubular member 47 is threaded into the threaded portion 46 of the piston body, and the outer end of said tubular member 47 is provided with threads as indicated at 48. A tubular member 49 of somewhat larger diameter is threaded to the tubular member 47. The outer end of said tubular member 49 is closed except for an opening 51, and the tubular member is provided with a port 52.

Mounted in the outer portion of the tubular member 49 and extending through the opening 51, is a tubular member 53. The inner end of the tubular member 53 is connected to a piston 54, and the outer end of the tubular member 53 is provided with a lubricating connection 55 which is adapted to be connected to a lubricating gun (not shown), which lubricating connection 55 prevents the passage of fluid from the tubular member 53. The piston 54 is provided with a central bore 56 which communicates with the bores in the tubular members 49 and 53, and with a radial bore 57 which is adapted to communicate with the port 52 when the spring 58 is compressed. The spring 58 is positioned around the tubular member 53 in the tubular member 49, and is adapted to urge the piston 54 inwardly in the tubular member 49, so that the radial bore 57 in the piston normally will not be in communication with the port 52. The tubular member 49 is provided with suitable stop means 59 in order to prevent excessive compression of the spring 58.

The outer end of the packing nut 14 may be threaded as indicated at 60 and a guard 61 threaded thereto, which guard may be easily removed.

The guard 61 surrounds the tubular member 49 in all positions except when the piston is at one of the ends of its stroke.

The pump is adapted to be operated in the usual manner and at the usual pressures, which range up to approximately five thousand pounds per square inch. The packing elements and liner may be lubricated by attaching a lubricating gun to the lubricating gun connection 55 and pumping a lubricant through the tubular member 53, passageway 56, tubular members 49 and 47, and passageways 45 and 44. It will be apparent that after a lubricant has been forced into the tubular member 49, that the lubricant will be under the pressure of the spring 58, and therefore urged through the passageways in the piston. As the packing elements 31 wear and fail, fluid will leak between the outer peripheries 43 of the packing elements 31 and the inside wall of the liner 15, into the annular recess 42. From the annular recess 42 the fluid will flow through the passageways 44 and 45, the tubular member 47, and into the tubular member 49. When the pressure in the tubular member 49 is sufficient, the piston 54 will be moved outwardly against the action of the spring 58, to such an extent that the radial bore 57 in the piston 54 will communicate with the port 52, thereby allowing the lubricant and fluid in the tubular member 49 to escape and indicate the fact that one or both of the packing elements 31 should be replaced. Instead of allowing the fluid to escape from the port 52, the fluid may be collected or connected to a pressure gauge, whistle or other indicating means.

If the packing elements are replaced as they fail, damage to the liner and piston body can be avoided. However, if the packing elements fail and are not replaced, continued operation of the pump results in serious damage to both the liner and the piston body, with the result that both the liner and the entire piston have to be replaced.

From the foregoing description, taken in connection with the accompanying drawings, it will be readily seen that the foregoing objects are accomplished by my invention, and that the uses, advantages, and operation of my invention will be readily understood by those skilled in the art to which the invention appertains. While I have described the form of my invention which I now consider to be the best embodiment thereof, I desire to have it understood that the form shown is merely illustrative, and that the invention is not to be limited to the details disclosed herein, but is to be accorded the full scope of the appended claims.

I claim:

1. In a pump having a cylinder, a pump piston operative in said cylinder, having a resilient packing means and a peripheral recess intermediate the ends of said pump piston, means defining a passageway extending through said piston and connecting said peripheral recess with the exterior of the pump so that fluid which leaks past an end of said piston into said peripheral recess will be conducted through said passageway to the exterior of said pump to indicate the failure of said packing means, and spring urged means connected to said passageway for resisting flow of leakage fluid therethrough.

2. In a pump having a cylinder, a pump piston operative in said cylinder, having a resilient packing means and a peripheral recess intermediate the ends of said pump piston, means defining a passageway extending through said piston and connecting said peripheral recess with the exterior of the pump so that fluid which leaks past an end of said piston into said peripheral recess will be conducted through said passageway to the exterior of said pump to indicate the failure of said packing means, spring urged means connected to said passageway for resisting flow of leakage fluid therethrough, and means connected to said passageway inwardly of said spring urged means, for delivering lubricant through said passageway to said recess.

3. In a pump, means for indicating piston packing failure comprising, a pump piston having a resilient packing means and a peripheral recess intermediate its ends, means defining a passageway in said piston connecting with said peripheral recess, a tubular member having its inner end connected to said passageway, said tubular member having a port communicating with the exterior of said pump, a piston in said tubular member, and means in said tubular member to urge said piston inwardly in said tubular member to a position where it will obstruct flow through said port.

4. In a pump, means for indicating piston packing failure comprising, a pump piston having a resilient packing means and a peripheral recess intermediate its ends, means defining a passageway in said piston connecting with said peripheral recess, a tubular member connected to said passageway, said tubular member extending through one of the ends of said pump and being provided with a port communicating with the exterior of said pump, a piston in said tubular member having an opening therethrough and being movable inwardly in said tubular member to a position wherein it will obstruct said port, and a lubricating duct communicating with said opening through said piston whereby a lubricant may be supplied through said tubular member and said passageway to said peripheral recess, and yielding means enabling movement of said piston to a position opening said port so that fluid which leaks into said peripheral recess of said pump piston will be conducted through said passageway, said tubular member and port to the exterior of said pump to indicate the failure of said packing means.

5. In a pump, means for indicating piston packing failure comprising, a pump piston having a resilient packing means and a peripheral recess intermediate its ends, means defining a passageway in said piston connecting with said peripheral recess, a tubular member connected to said passageway, said tubular member extending through one of the ends of said pump and being provided with a port communicating with the exterior of said pump, a piston in said tubular member, resilient means urging said piston inwardly in said tubular member to a position wherein it will obstruct said port, but enabling yielding movement of said piston to a position in said tubular member wherein it will open said port so that fluid which leaks into said peripheral recess of said pump piston will be conducted through said passageway, said tubular member and port to the exterior of said pump to indicate the failure of said packing means.

References Cited in the file of this patent

UNITED STATES PATENTS

| 1,732,366 | John | Oct. 22, 1929 |
| 1,774,967 | Ellis | Sept. 2, 1930 |
| 1,818,187 | Bailey | Aug. 11, 1931 |